(12) United States Patent
Kunz et al.

(10) Patent No.: US 11,375,444 B2
(45) Date of Patent: Jun. 28, 2022

(54) INDICATING A NETWORK FOR A REMOTE UNIT

(71) Applicant: Lenovo (Singapore) PTE. LTD., New Tech Park (SG)

(72) Inventors: Andreas Kunz, Ladenburg (DE); Genadi Velev, Darmstadt (DE); Apostolis Salkintzis, Athens (GR); Dimitrios Karampatsis, Ruislip (GB)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 4 days.

(21) Appl. No.: 16/755,486

(22) PCT Filed: Dec. 18, 2017

(86) PCT No.: PCT/EP2017/083384
§ 371 (c)(1),
(2) Date: Apr. 10, 2020

(87) PCT Pub. No.: WO2019/120477
PCT Pub. Date: Jun. 27, 2019

(65) Prior Publication Data
US 2020/0344678 A1    Oct. 29, 2020

(51) Int. Cl.
*H04W 48/18* (2009.01)
*H04W 4/50* (2018.01)
(Continued)

(52) U.S. Cl.
CPC ............ *H04W 48/18* (2013.01); *H04W 4/50* (2018.02); *H04W 12/037* (2021.01); *H04W 60/00* (2013.01); *G16Y 30/00* (2020.01)

(58) Field of Classification Search
CPC ..... H04W 48/18; H04W 4/50; H04W 12/037; H04W 60/00; G16Y 30/00
See application file for complete search history.

(56) References Cited

U.S. PATENT DOCUMENTS

2006/0114870 A1* 6/2006 Buckley ............ H04W 72/0493
370/338
2016/0014676 A1 1/2016 Taneja
(Continued)

FOREIGN PATENT DOCUMENTS

WO    2017063708 A1    4/2017

OTHER PUBLICATIONS

International Application No. PCT/EP2017/083384, "Notification of Transmittal of the International Search Report and the Written Opinion of the International Searching Authority, or the Declaration" dated Jun. 20, 2018, pp. 1-12.
(Continued)

*Primary Examiner* — Walli Z Butt
*Assistant Examiner* — Shawn D Miller
(74) *Attorney, Agent, or Firm* — Kunzler Bean & Adamson

(57) ABSTRACT

Apparatuses, methods, and systems are disclosed for indicating a network for a remote unit. One method (600) includes transmitting (602) a first message including a first registration request from a remote unit (102). The first message includes a discovery indication indicating that the remote unit (102) is attempting to discover a network configured for use by the remote unit (102). The method (600) includes receiving (604) a second message including a list of networks configured for use by the remote unit (102). The second message is received in response to transmitting (602) the first message. The method (600) includes transmitting (606) a third message including a second registration request from the remote unit (102). The second registration request includes an indication of a network selected from the list of networks configured for use by the remote unit (102).

17 Claims, 7 Drawing Sheets

(51) Int. Cl.
*H04W 60/00* (2009.01)
*H04W 12/037* (2021.01)
*G16Y 30/00* (2020.01)

(56) References Cited

U.S. PATENT DOCUMENTS

| | | | |
|---|---|---|---|
| 2018/0103363 A1* | 4/2018 | Faccin | H04L 67/14 |
| 2018/0317163 A1* | 11/2018 | Lee | H04W 4/70 |
| 2019/0155659 A1* | 5/2019 | Rodriguez Bravo | H04L 67/16 |
| 2019/0295074 A1* | 9/2019 | Carrott | G06Q 20/385 |
| 2020/0059976 A1* | 2/2020 | Bhatia | H04W 8/005 |

OTHER PUBLICATIONS

3GPp, "3rd Generation Partnership Project; Technical Specification Group Services and System Aspects; Architecture enhancements to facilitate communications with packet data networks and applications (Release 15)", 3GPP TS 23.682 V15.2.0, Sep. 2017, pp. 1-122.

Qulcomm Incorporated et al., "New Study on Cellular IoT evolution towards 5G requirements", SA WG2 Meeting #122 S2-175266, Jun. 25-29, 2017, pp. 1-4.

3GPP, "3rd Generation Partnership Project; Technical Specification Group Radio Access Network; Study on Scenarios and Requirements for Next Generation Access Technologies; (Release 14)", 3GPP TR 38.913 V14.3.0, Jun. 2017, pp. 1-39.

3GPP, "3rd Generation Partnership Project; Technical Specification Group Services and System Aspects; Procedures for the 5G System; Stage 2 (Release 15)", 3GPP TS 23.502 V2.0.0, Dec. 2017, pp. 1-260.

3GPP, "3rd Generation Partnership Project; Technical Specification Group Services and System Aspects; Service requirements for the 5G system; Stage 1 (Release 16)", 3GPP TS 22 261 V16.1 0, Sep. 2017, pp. 1-52.

3GPP, "3rd Generation Partnership Project; Technical Specification Group Services and System Aspects; System Architecture for the 5G System; Stage 2 (Release 15)", 3GPP TS 23.501 V2.0.1, Dec. 2017, pp. 1-183.

* cited by examiner

INDICATING A NETWORK FOR A REMOTE UNIT

FIELD

The subject matter disclosed herein relates generally to wireless communications and more particularly relates to indicating a network for a remote unit.

BACKGROUND

The following abbreviations are herewith defined, at least some of which are referred to within the following description: Third Generation Partnership Project ("3GPP"), Authentication Authorization and Accounting ("AAA"), Positive-Acknowledgment ("ACK"), Access and Mobility Management Function ("AMF"), Authentication Server Function ("AUSF"), Downlink ("DL"), Domain Name System ("DNS"), Enhanced Mobile Broadband ("eMBB"), Evolved Node B ("eNB"), Enhanced Subscriber Identification Module ("eSIM"), Equipment Identity Register ("EIR"), European Telecommunications Standards Institute ("ETSI"), Frequency Division Duplex ("FDD"), Frequency Division Multiple Access ("FDMA"), Fully Qualified Domain Name ("FQDN"), Global System For Mobile Communications Association ("GSMA"), Hybrid Automatic Repeat Request ("HARQ"), Home Policy Control Function ("H-PCF"), Home Public Land Mobile Network ("HPLMN"), International Mobile Equipment Identity ("IMEI"), International Mobile Subscriber Identity ("IMSI"), Internet-of-Things ("IoT"), Long Term Evolution ("LTE"), Multiple Access ("MA"), Modulation Coding Scheme ("MCS"), Mobile Country Code ("MCC"), Mobile Network Code ("MNC"), Machine Type Communication ("MTC"), Master Information Block ("MIB"), Mobility Management ("MM"), Non-Access Stratum ("NAS"), Narrowband ("NB"), Negative-Acknowledgment ("NACK") or ("NAK"), Next Generation Node B ("gNB"), Orthogonal Frequency Division Multiplexing ("OFDM"), Over-the-Air ("OTA"), Policy Control Function ("PCF"), Public Land Mobile Network ("PLMN"), Pointer ("PTR"), Quality of Service ("QoS"), Radio Resource Control ("RRC"), Radio Access Network ("RAN"), Receive ("RX"), Single Carrier Frequency Division Multiple Access ("SC-FDMA"), Subscriber Management Function ("SMF"), Subscriber Identity Module ("SIM"), System Information Block ("SIB"), Subscription Concealed Identifier ("SUCI"), Subscription Permanent Identifier ("SUPI"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane Function ("UPF"), Universal Subscriber Identity Module ("USIM"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a remote unit may have multiple networks that may be communicated with. In such networks, the remote unit may be subscribed to only one network out of the multiple networks.

BRIEF SUMMARY

Methods for indicating a network for a remote unit are disclosed. Apparatuses and systems also perform the functions of the apparatus. In one embodiment, the method includes transmitting a first message including a first registration request from a remote unit. In such embodiments, the first message includes a discovery indication indicating that the remote unit is attempting to discover a network configured for use by the remote unit. In various embodiments, the method includes receiving a second message including a list of networks configured for use by the remote unit. In such embodiments, the second message is received in response to transmitting the first message. In certain embodiments, the method includes transmitting a third message including a second registration request from the remote unit. In such embodiments, the second registration request includes an indication of a network selected from the list of networks configured for use by the remote unit.

In one embodiment, the method includes determining a set of available mobile networks. In a further embodiment, the method includes determining a first mobile network of the set of available mobile networks based on information indicating that the first mobile network supports Internet-of-things device registration. In certain embodiments, transmitting the first message includes transmitting the first message to the first mobile network of the set of available mobile networks. In various embodiments, transmitting the third message includes transmitting the third message to a second mobile network of the set of available mobile networks, and the second mobile network is determined based on the list of networks. In some embodiments, the list of networks configured for use by the remote unit includes networks for which the remote unit has a subscription to.

In some embodiments, the first registration request and the second registration request each include an internet-of-things initial registration request. In various embodiments, the first message and the third message each include an encryption key corresponding to the remote unit, and the encryption key is used to encrypt data transmitted to the remote unit. In one embodiment, the second message includes an encryption key corresponding to a network device, and the encryption key is used to encrypt data transmitted to the network device. In various embodiments, the remote unit includes an internet-of-things device out of a set of internet-of-things devices.

An apparatus for indicating a network for a remote unit, in one embodiment, includes a transmitter that transmits a first message including a first registration request from the apparatus. In such embodiments, the first message includes a discovery indication indicating that the apparatus is attempting to discover a network configured for use by the apparatus. In various embodiments, the apparatus includes a receiver that receives a second message including a list of networks configured for use by the apparatus. In such embodiments, the second message is received in response to transmitting the first message. In some embodiments, the transmitter transmits a third message including a second registration request from the apparatus. In such embodiments, the second registration request includes an indication of a network selected from the list of networks configured for use by the apparatus.

In one embodiment, a method for indicating a network for a remote unit includes receiving a first message including a registration request transmitted from a remote unit. In such an embodiment, the first message includes a discovery indication indicating that the remote unit is attempting to discover a network configured for use by the remote unit. In various embodiments, the method includes determining a list of networks configured for use by the remote unit. In certain embodiments, the method includes transmitting a second message including the list of networks configured for use by the remote unit. In such embodiments, the second message is transmitted in response to receiving the first message.

In one embodiment, the registration request includes an internet-of-things initial registration request. In a further embodiment, the first message includes an encryption key corresponding to the remote unit. In certain embodiments, the second message includes an encryption key corresponding to a network device. In some embodiments, the remote unit includes an internet-of-things device out of a set of internet-of-things devices. In certain embodiments, determining the list of networks configured for use by the remote unit further includes transmitting a request to a database for the list of networks configured for use by the remote unit, wherein the database includes a correlation between the remote unit and the list of networks. In various embodiments, determining the list of networks configured for use by the remote unit further includes receiving a response to the request from the database, and the response includes the list of networks configured for use by the remote unit.

An apparatus for indicating a network for a remote unit, in one embodiment, includes a receiver that receives a first message including a registration request transmitted from a remote unit. In such embodiments, the first message includes a discovery indication indicating that the remote unit is attempting to discover a network configured for use by the remote unit. In various embodiments, the apparatus includes a processor that determines a list of networks configured for use by the remote unit. In some embodiments, the apparatus includes a transmitter that transmits a second message including the list of networks configured for use by the remote unit. In such embodiments, the second message is transmitted in response to receiving the first message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
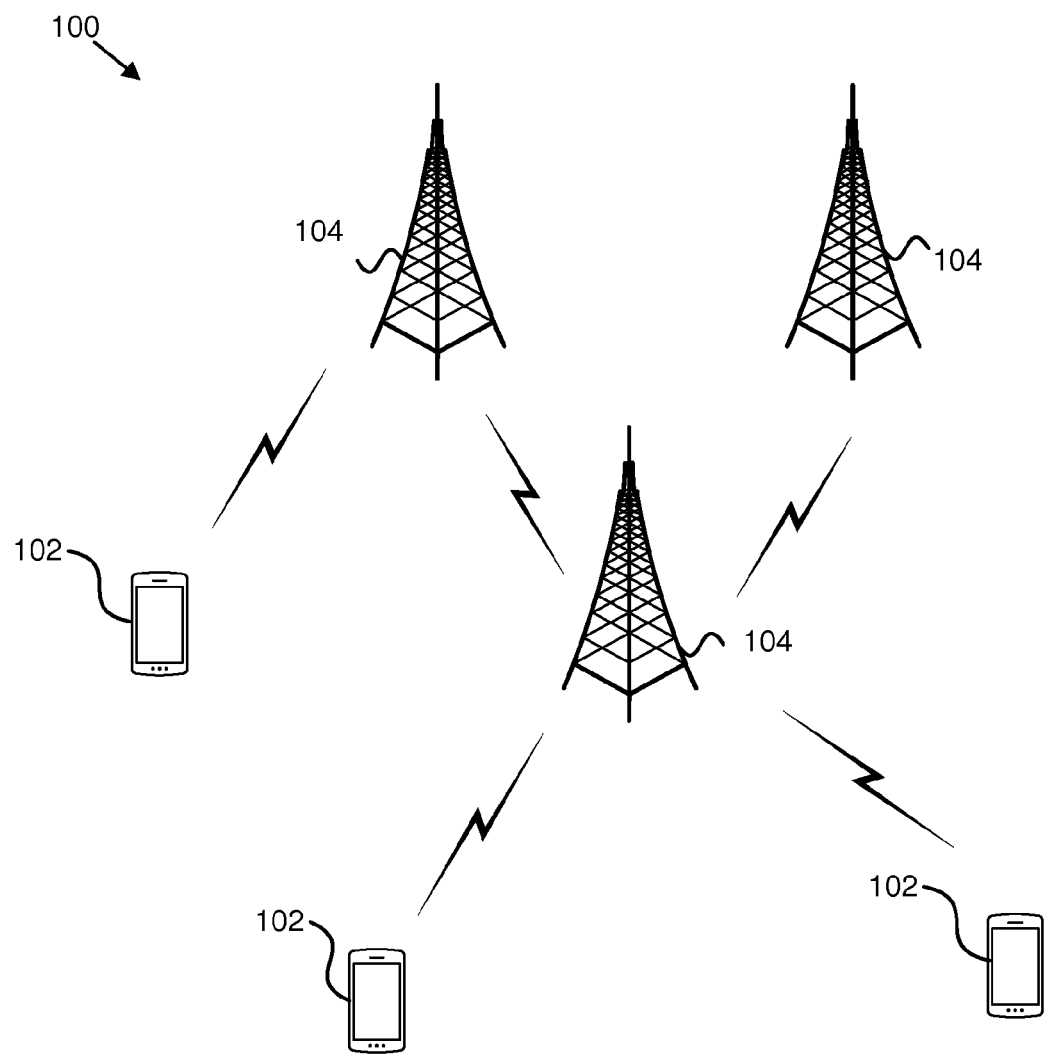
FIG. 1 is a schematic block diagram illustrating one embodiment of a wireless communication system for indicating a network for a remote unit.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for indicating a network for a remote unit 102. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components a gNB, an AMF, a DB, a PCF, a UDR, a UPF, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may transmit a first message including a first registration request. In such embodiments, the first message includes a discovery indication indicating that the remote unit 102 is attempting to discover a network configured for use by the remote unit 102. In various embodiments, the remote unit 102 may receive a second message including a list of networks configured for use by the remote unit 102. In such embodiments, the second message is received in response to transmitting the first message. In some embodiments, the remote unit 102 may transmit a third message including a second registration request. In such embodiments, the second registration request includes an indication of a network selected from the list of networks configured for use by the remote unit 102. Accordingly, a remote unit 102 may be used for receiving an indication of a network for the remote unit 102.

In various embodiments, a network unit 104 may receive a first message including a registration request transmitted from a remote unit 102. In such embodiments, the first message includes a discovery indication indicating that the remote unit 102 is attempting to discover a network configured for use by the remote unit 102. In various embodiments, the network unit 104 may determine a list of networks configured for use by the remote unit 102. In some embodiments, the network unit 104 may transmit a second message including the list of networks configured for use by the remote unit 102. In such embodiments, the second message is transmitted in response to receiving the first message. Accordingly, a network unit 104 may be used for indicating a network for the remote unit 102.

Figure 2:
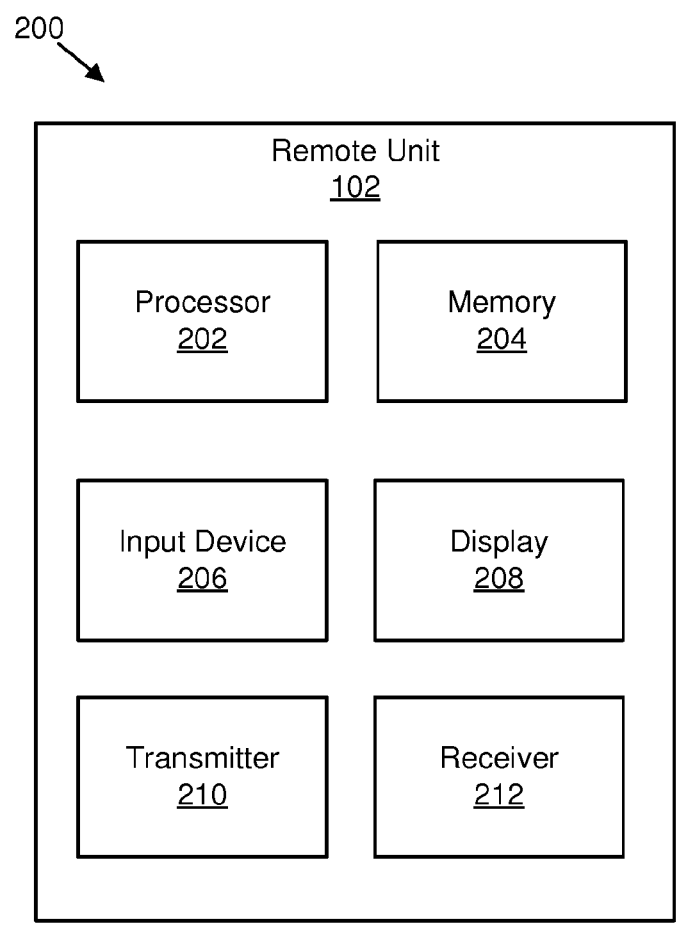
FIG. 2 is a schematic block diagram illustrating one embodiment of an apparatus that may be used for receiving an indication of a network for a remote unit.

FIG. 2 depicts one embodiment of an apparatus 200 that may be used for receiving an indication of a network for the remote unit 102. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to network registration. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In certain embodiments, the transmitter 210 is used to transmit a first message including a first registration request from the apparatus 200. In such embodiments, the first message includes a discovery indication indicating that the apparatus 200 is attempting to discover a network configured for use by the apparatus 200. In various embodiments, the receiver 212 is used to receive a second message including a list of networks configured for use by the apparatus 200. In such embodiments, the second message is received in response to transmitting the first message. In some embodiments, the transmitter 210 is used to transmit a third message including a second registration request from the apparatus 200. In such embodiments, the second registration request includes an indication of a network selected from the list of networks configured for use by the apparatus 200. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
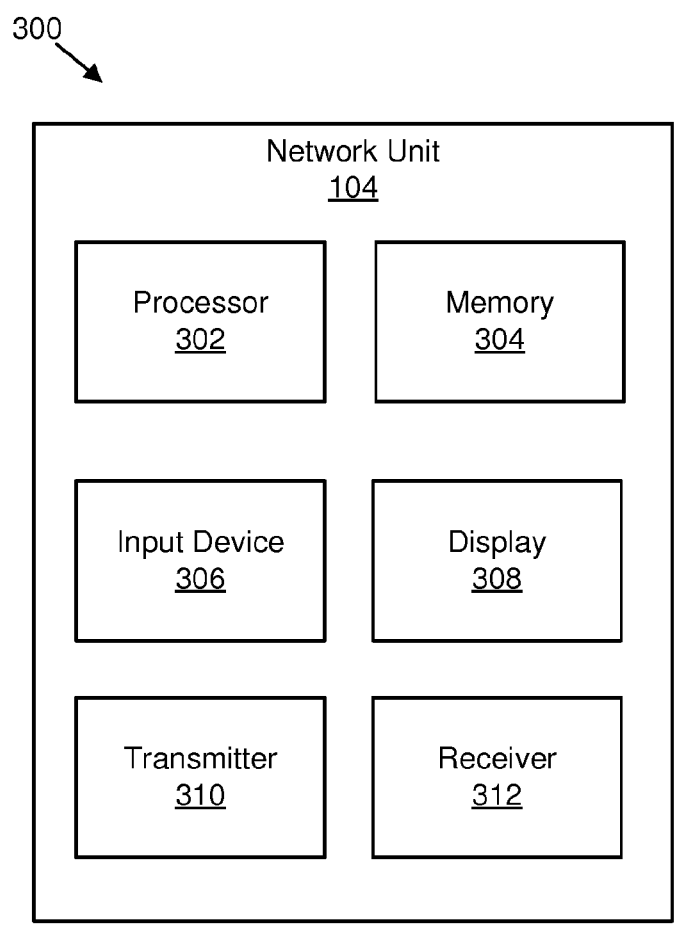
FIG. 3 is a schematic block diagram illustrating one embodiment of an apparatus that may be used for indicating a network for a remote unit.

FIG. 3 depicts one embodiment of an apparatus 300 that may be used for indicating a network for the remote unit 102. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 is used to receive a first message including a registration request transmitted from a remote unit 102. In such an embodiment, the first message includes a discovery indication indicating that the remote unit 102 is attempting to discover a network configured for use by the remote unit 102. In various embodiments, the processor 302 is used to determine a list of networks configured for use by the remote unit 102. In some embodiments, the transmitter 310 is used to transmit a second message including the list of networks configured for use by the remote unit 102. In such embodiments, the second message is transmitted in response to receiving the first message. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, credentials for a remote unit 102 (e.g., IoT UE) may be found in a UDM, but not in the remote unit 102. In such embodiments, the subscriber (e.g., a big company) may buy many remote units 102 (e.g., IoT devices, a set of IoT devices, etc.) and a subscription for each remote unit 102. Moreover, all of the remote units 102 may be considered "off the shelf"—meaning that the remote units 102 do not have credentials stored in the remote units 102. As may be appreciated, credentials as used herein may mean network information such as a home PLMN, subscription information, authentication information, access information, and so forth.

In addition, the remote unit 102 operator does not have information about the remote units 102, but the remote unit 102 operator reserves credentials in a UDM and/or AUSF and creates a corresponding number of subscription profiles (e.g., one for each remote unit 102). The subscriber provides the remote unit 102 operator with information of the device identities ("IDs") (e.g., this may be an IMEI or a unique identifier) which is used for binding the remote units 102 to the subscription profile. Because the remote units 102 do not have any information about their subscription, the remote units 102 won't necessarily be able to connect to the correct PLMN on a first try but instead may select an initial PLMN based on a strongest radio signal. In order to find the correct PLMN, the remote unit 102 operator may configure a database (e.g., a global database, a country database, etc.) with the binding information of device IDs and subscription IDs. In one embodiment, the subscription IDs may each be IMSI, SUPI, and/or SUCI (e.g., the encrypted SUPI) and may point to an operator identity ("ID") (e.g., MNC and/or MCC). In some embodiments, the subscription IDs may be a group SUPI (e.g., a special SUPI identifying a pool of subscriptions from which the UDM activates the subscriber profiles). In various embodiments, the subscription IDs may include a list of PLMNs (e.g., especially in response to a remote unit 102 being roaming or otherwise unavailable to a HPLMN). If the subscription IDs use one or more SUPI, encryption of the SUPI may be performed in a mobile operator domain (e.g., the UDM) and stored encrypted in a database. This may be because the database holding the subscription information may be outside the mobile operator domain (and may therefore not have an unencrypted subscription ID, such as for privacy and/or security). In some embodiments, a subscription database may be globally maintained by an organization (e.g., GSMA) and/or may be specific within a country (e.g., maintained by an independent organization). In various embodiments, the subscription database may be part of an EIR and/or may be collocated with any network function (e.g., AMF, SMF, UDM, etc.). In certain embodiments, the remote unit 102 operator may be able to detect if an unsubscribed remote unit 102 pretends to use one of its registered subscriptions based on an initial encrypted SUPI (which is not time dependent). In some embodiments, a remote unit 102 may encrypt a SUPI in a time dependent manner to minimize replay attacks. In various embodiments, a remote unit 102 may be preconfigured with and/or able to generate an encryption key (e.g., public and/or private key, certificate) and may be able to store an encryption key from a network. In certain embodiments, if preconfigured encryption keys are installed in a remote unit 102, then a subscription database may authenticate a request from the remote unit 102.

Figure 4:
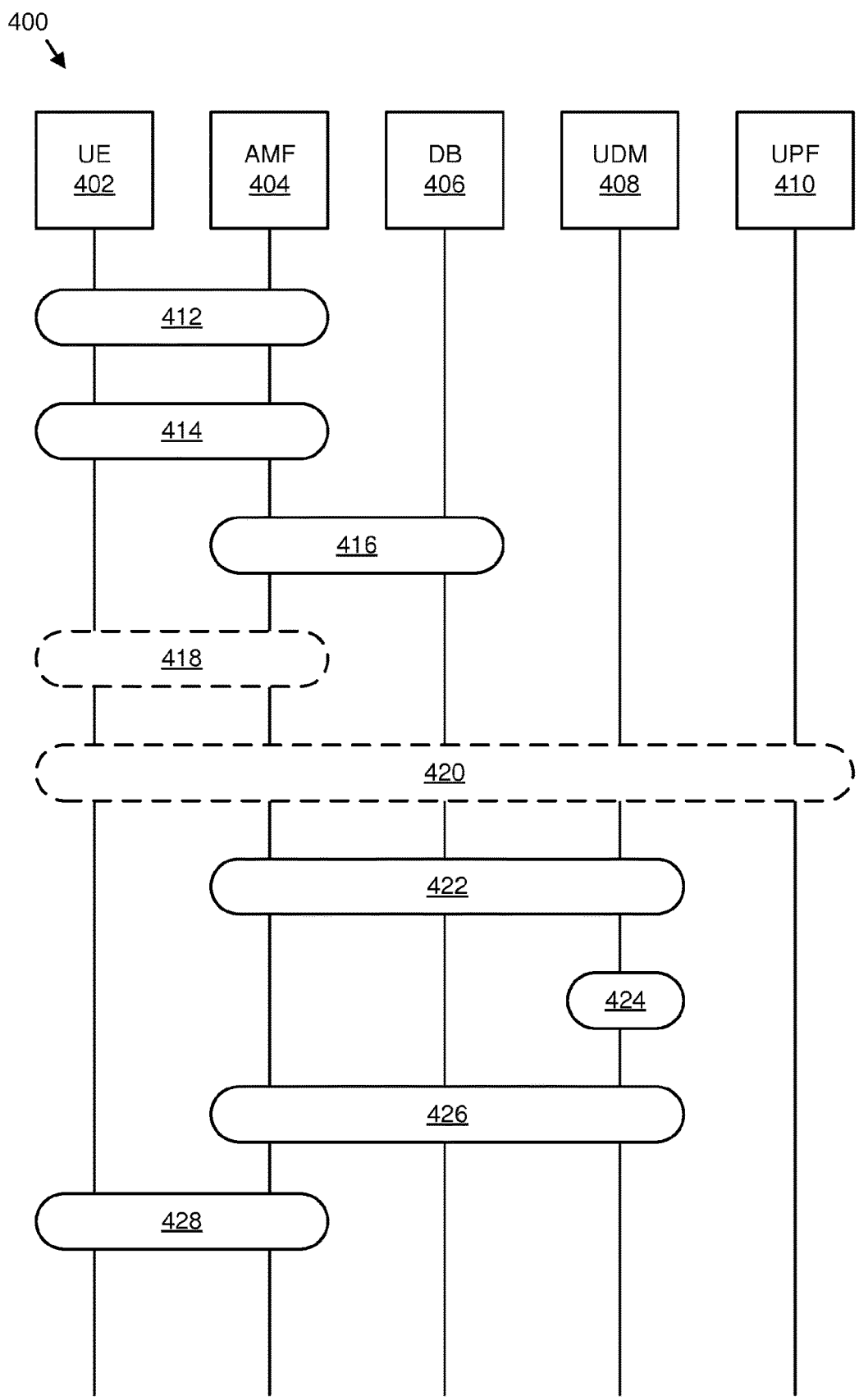
FIG. 4 illustrates one embodiment of communications for registering a device.
Figure 5:
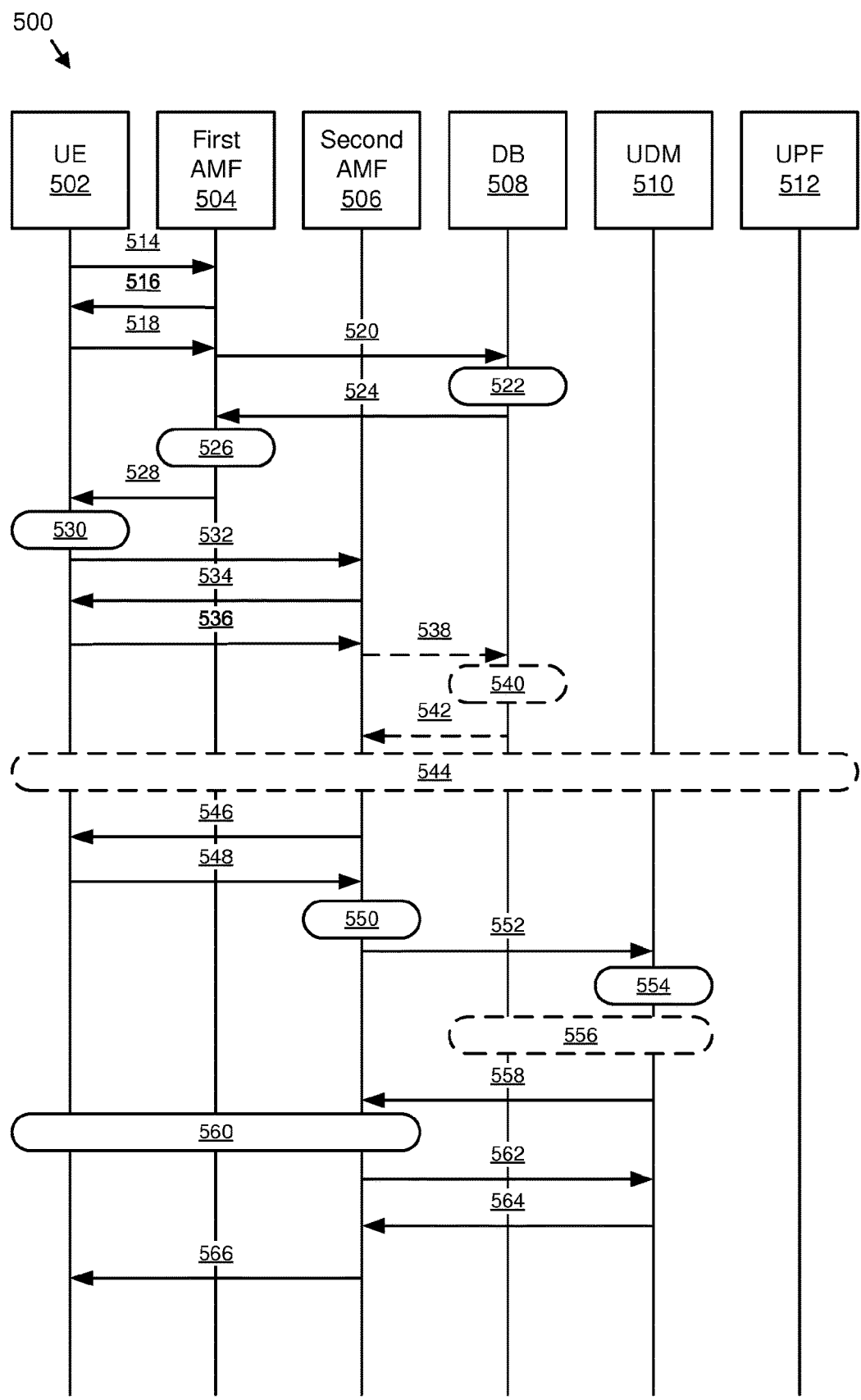
FIG. 5 illustrates another embodiment of communications for registering a device.

FIGS. 4 and 5 illustrate registration requests sent to a PLMN with different options. In FIG. 4, a remote unit 102 (e.g., UE) subscription belongs to a PLMN that it sends a registration request to; while in FIG. 5, a remote unit 102 (e.g., UE) subscription does not belong to a PLMN that it sends a registration request to. As used herein, a remote unit 102 may "belong" to a network if the remote unit 102 has a subscription for the network.

FIG. 4 illustrates one embodiment of communications 400 for registering a device (e.g., a remote unit 102). Specifically, communications 400 between a UE 402, an AMF 404, a database ("DB") (e.g., a subscription binding database, a device identification binding database, etc.) 406, a UDM 408, and a UPF 410 are illustrated. As may be appreciated, any of the communications 400 described herein may be considered messages and/or parts of messages.

In some embodiments, the UE 402 performs 412 PLMN selection and sends a registration request for IoT registration to the AMF 404. In certain embodiments, a RAN may be configured to broadcast (e.g., in SIB or MIB) an indication that a network supports IoT restricted registration procedure with PLMN discovery. In such embodiments, the UE 402 may use this information to perform PLMN selection (e.g., the UE 402 may first try networks which support a IoT restricted registration procedure before trying the PLMNs that do not broadcast this information). In various embodiments, the UE 402 may indicate that the registration request is for initial IoT registration and may include an encryption key (e.g., a public key, a certificate). In such embodiments, if the encryption key is preconfigured to the UE 402 and included in the registration request, then the UE 402 may be authenticated (e.g., in the AMF 404 or DB 406). In certain embodiments, the registration request may include a discovery indication indicating that the UE 402 is attempting to discover a network configured for use by the remote unit.

In various embodiments, the AMF 404 detects 414 that a registration request is for initial IoT registration and requests that the UE 402 sends it's device ID in order to retrieve a SUPI. In certain embodiments, if the UE 402 includes a certificate, the AMF 404 may determine (e.g., verify) whether it trusts the UE 402. In some embodiments, the AMF 404 may encrypt a reply to the registration request with the UE's 402 encryption key and include an encryption key (e.g., a public key, a certificate) for the AMF 404. In such embodiments, the UE 402 may verify the AMF 404 encryption key if available and the UE 402 may send its device ID (e.g., IMEI, a unique string—such as a device manufacturer globally uniquely provisioned string) encrypted with the AMF 404 encryption key to the AMF 404. In one embodiment, if the UE 402 has not provided its encryption key, the UE 402 may include its encryption key.

In certain embodiments, the AMF 404 contacts 416 the DB 406. In some embodiments, the DB 406 may be broadly maintained (e.g., by an organization such as GSMA, by a specific organization within a country, by an independent organization, globally, geographically, etc.). In various embodiments, in the DB 406, a SUPI corresponding to a device ID may be stored with the device ID. In such embodiments, the SUPI may be preconfigured and/or encrypted (e.g., SUCI). In certain embodiments, the DB 406 may authenticate the registration request from the UE 402 if an encryption key is present and may provide an encrypted SUPI (e.g., which includes a PLMN ID—such as MNC and/or MCC) to the AMF 404. In some embodiments, if the UE 402 cannot be authenticated or there is no database entry corresponding to the device ID (e.g., the database entry never existed, the database entry was removed, etc.), then the DB 406 may reject the registration request. In certain embodiments, interaction between the AMF 404 and the DB 406 may be similar to interactions between the AMF 404 and the UDM 408 and/or interactions between the AMF 404 and an AAA server.

In some embodiments, the AMF 404 may detect 418 whether the UE 402 is part of the same PLMN as the AMF 404 by comparing an unencrypted MNC and/or MCC of a SUPI. In certain embodiments, if the UE 402 has the subscription with another PLMN, the AMF 404 sends a registration request reject to the UE 402. In various embodiments, the registration request reject may include the SUPI (e.g., encrypted SUPI, an indication of a network to which the UE 402 belongs). In some embodiments, the UE 402 stores the SUPI and uses MNC and/or MCC for PLMN selection. In certain embodiments, the UE 402 may not have credentials to unencrypt a SUPI. In various embodiments, the UE 402 selects a PLMN from the SUPI and sends a new registration request for IoT registration to the AMF 404. The new registration request may indicate that the registration request is for IoT initial registration and may include an encryption key (e.g., a public key, a certificate) and SUPI (e.g., encrypted SUPI).

In various embodiments, if the UE 402 belongs to the same PLMN, then long term credentials, USIM, and/or eSIM are provisioned 420 to the UE 402. As may be appreciated, there may be different technologies to provision the long term credentials, the USIM, and/or the eSIM to the UE 402. In some embodiments, there may be messages exchanged between various devices or functions to signal a credential server (e.g., OTA server) identity and address, a UICC ID, a UICC vendor ID of the UE 402, and/or OTA keys for securing credentials.

In certain embodiments, after successfully provisioning long term credentials, USIM, and/or eSIM, the AMF 404 sends 422 an IoT subscription profile activation request to the UDM 408. In some embodiments, the IoT subscription profile activation request may include a device ID and a SUPI. In various embodiments, after successful provisioning the AMF 404 may send a registration accept for IoT indicating that the network is ready to receive a real registration from the UE 402. In certain embodiments, the UE 402 may use received credentials to register with a network. In some embodiments, once the AMF 404 receives a registration request, the registration request may trigger a subscription profile activation request, which may be a normal UDM subscriber profile query.

In some embodiments, the UDM 408 verifies 424 the SUPI and device ID binding, verifies whether it is the first request for subscription activation, and/or verifies whether there was no misuse of a SUPI (e.g., initial and/or encrypted). In one embodiment, the UDM 408 activates a subscription profile corresponding to the device ID.

In various embodiments, the UDM 408 provides 426 a subscription profile corresponding to the UE 402 to the AMF 404. In certain embodiments, the AMF 404 may not run any authentication and/or authorization procedure at this time because the UE 402 may not be provisioned with corresponding credentials. In some embodiments, the subscription profile may contain the SUPI (e.g., unencrypted).

In certain embodiments, the AMF 404 sends 428 a registration accept to the UE 402.

FIG. 5 illustrates another embodiment of communications 500 for registering a device (e.g., a remote unit 102). Specifically, communications 500 between a UE 502, a first AMF 504 (e.g., AMF of a first PLMN), a second AMF 506 (e.g., AMF of a second PLMN), a DB 508, a UDM 510, and a UPF 512 are illustrated. As may be appreciated, any of the communications 500 described herein may be considered messages and/or parts of messages.

In some embodiments, a first communication 514 from the UE 502 to the first AMF 504 may include the UE 502 performing PLMN selection and sending a registration request for IoT registration to the first AMF 504. In certain embodiments, a RAN may be configured to broadcast (e.g., in SIB or MIB) an indication that a network supports IoT restricted registration procedure with PLMN discovery. In such embodiments, the UE 502 may use this information to perform PLMN selection (e.g., the UE 502 may first try networks which support a IoT restricted registration procedure before trying the PLMNs that do not broadcast this information). In various embodiments, the UE 502 may indicate that the registration request is for initial IoT registration and may include an encryption key (e.g., a public key, a certificate). In such embodiments, if the encryption key is pre-provisioned to the UE 502 and included in the registration request, then the UE 502 may be authenticated (e.g., in the first AMF 504 or DB 508). In certain embodiments, the registration request may include a discovery indication indicating that the UE 502 is attempting to discover a network configured for use by the remote unit.

In various embodiments, a second communication 516 from the first AMF 504 to the UE 502 may include the first AMF 504, after it detects that a registration request is for initial IoT registration, requesting that the UE 502 sends it's device ID in order to retrieve a SUPI. In certain embodiments, if the UE 502 includes a certificate, the first AMF 504 may determine (e.g., verify) whether it trusts the UE 502. In some embodiments, the first AMF 504 may encrypt a reply to the registration request with the UE's 502 encryption key and include an encryption key (e.g., a public key, a certificate) for the first AMF 504.

In a third communication 518 from the UE 502 to the first AMF 504, the UE 502, after verifying the first AMF 504 encryption key if available, may send its device ID (e.g., IMEI, a unique string—such as a device manufacturer globally uniquely provisioned string) encrypted with the first AMF 504 encryption key to the first AMF 504. In one embodiment, if the UE 502 has not provided its encryption key, the UE 502 may include its encryption key.

In certain embodiments, in a fourth communication 520 from the first AMF 504 to the DB 508, the first AMF 504 may contact the DB 508 to request a SUPI corresponding to the device ID of the UE 502. In some embodiments, the DB 508 may be broadly maintained (e.g., by an organization such as GSMA, by a specific organization within a country, by an independent organization, globally, geographically, etc.). In various embodiments, in the DB 508, a SUPI corresponding to a device ID may be stored with the device ID and/or a list of one or more PLMNs corresponding to the device ID may be stored with the device ID. In such embodiments, the SUPI may be preconfigured and/or encrypted.

In some embodiments, the DB 508 may authenticate 522 the registration request from the UE 502 if an encryption key is present. In certain embodiments, if the UE 502 cannot be authenticated or there is no database entry corresponding to the device ID (e.g., the database entry never existed, the database entry was removed, etc.), then the DB 508 may reject the registration request.

In various embodiments, in a fifth communication 524 from the DB 508 to the first AMF 504, the DB 508 may provide an encrypted SUPI (e.g., which includes a PLMN ID—such as MNC and/or MCC) corresponding to the device ID of the UE 502 to the first AMF 504 and/or the DB 508 may provide a list of one or more PLMNs corresponding to the device ID of the UE 502 to the first AMF 504. In certain embodiments, interaction between the first AMF 504 and the DB 508 may be similar to interactions between the first AMF 504 and the UDM 510 and/or interactions between the first AMF 404 and an AAA server.

In certain embodiments, the first AMF 504 may detect 526 whether the UE 502 is part of the same PLMN as the first AMF 504 by comparing an unencrypted MNC and/or MCC of a SUPI and/or by comparing a PLMN of the first AMF 504 to the list of one or more PLMNs corresponding to the device ID of the UE 502.

In a sixth communication 528 from the first AMF 504 to the UE 502, the first AMF 504 sends a registration reject to the UE 502 in response to determining that the UE 502 is not part of the same PLMN as the first AMF 504. In some embodiments, the registration reject may include an encrypted SUPI corresponding to the device ID of the UE 502 and/or a list of one or more PLMNs corresponding to the device ID of the UE 502 (e.g., an indication of a network to which the UE 502 belongs). In certain embodiments in which an encrypted SUPI is sent as part of the registration reject, then the message may be encrypted with the UE's 502 encryption key to protect the encrypted SUPI (e.g., because SUPI encryption may not be time dependent, not encrypting the SUPI with the encryption key may lead to replay attacks if leaked to an attacker pretending to be the real subscriber belonging to the SUPI). In various embodiments, the first AMF 504 receives a registration request with a PLMN discovery indication. In such embodiments, the first AMF 504 may construct an FQDN in the form <deviceId>.provisioning.3GPPnetwork.org and send a DNS PTR query with this FQDN. Essentially, this DNS query attempts to find all provisioning servers that can be used to provision the UE 502. The DNS response could include a list of equivalent PLMNs, such as: serverA.<MNC-a>.<MCC-a>0.3GPPnetwork.org; serverB.<MNC-b>.<MCC-b>.3GPPnetwork.org.

In various embodiments, the UE 502 may store 530 an encrypted SUPI and may extract MNC and/or MCC from the encrypted SUPI in order to know the PLMN ID of the subscription corresponding to the UE 502. In some embodiments, the UE 502 performs PLMN selection and selects its HPLMN=a second PLMN (e.g., PLMN indicated by the PLMN ID).

In a seventh communication 532 from the UE 502 to the second AMF 506, the UE 502 sends a registration request for IoT registration to the second AMF 506. In some embodiments, the UE 502 indicates that the registration request is for IoT initial registration and may include its encryption key (e.g., public key, certificate). In certain embodiments, the registration request may include an indication (e.g., flag) used to indicate that a HPLMN query with the DB 508 is not required. In various embodiments, an intermediate RAN detects that the registration request is for IoT registration based on the indication in the request and selects an appropriate AMF. In some embodiments, there may be a dedicated AMF for handling initial IoT registration requests. In certain embodiments, the UE 502 may include a PLMN ID in the registration request (e.g., an indication of the network to which the UE 502 belongs). In such embodiments, the PLMN ID may be selected from a list of one or more PLMNs received from the DB 508. In various embodiments, the second AMF 506 may detect that a PLMN ID received is a PLMN ID for initial IoT registration.

In an eighth communication 534 from the second AMF 506 to the UE 502, the second AMF 506 detects that the registration request is for initial IoT registration and requests with a request for the UE 502 to send it's device ID. In some embodiments, if the UE 502 has included an encryption key transmission to the second AMF 506, the second AMF 506 may verify whether it trusts the UE 502. In certain embodiments, the second AMF 506 may encrypt the request with the UE's 502 encryption key if available and include it's second AMF 506 encryption key (e.g., public key, certificate).

In a ninth communication 536 from the UE 502 to the second AMF 506, after the UE 502 verifies the second AMF 506 encryption key (if available), the UE 502 may send its encrypted SUPI and Device ID (e.g., IMEI, a unique string—such as a device manufacturer globally uniquely provisioned string) encrypted with the second AMF 506 encryption key to the second AMF 506. In one embodiment, if the UE 502 has not provided its encryption key, the UE 502 may include its encryption key.

In a tenth communication 538 from the second AMF 506 to the DB 508, the second AMF 506 may detect that the UE 502 identified SUPI is part of the same PLMN as the second AMF 506. In some embodiments, the second AMF 506 may not trust the UE 502 information and may sends a SUPI Request to the DB 508 in order to verify the binding between the UE 502 and the SUPI, to determine whether the SUPI is compromised, to determine whether the DB 508 has deleted its reference to the UE 502, and/or to determine whether the UE 502 is blacklisted in the DB 508.

In some embodiments, the DB 508 may verify 540 the request and determine whether a request for this SUPI was previously sent, determine whether the DB 508 has been notified that the profile belonging to this SUPI has already been activated, and/or determine whether the entry for this SUPI has been deleted (e.g., due to a termination of the subscription, prior registration, etc.).

In an eleventh communication 542 from the DB 508 to the second AMF 506, the DB 508 provides the encrypted SUPI corresponding to the device ID sent from the UE 502 (e.g., the SUPI may be a random identity that has a correct PLMN ID—such as including MNC and/or MCC) back to the second AMF 506. In certain embodiments, the tenth communication 538, the verify 540, and the eleventh communication 542 may not be performed if the second AMF 506 trusts the UE 502 SUPI information. In some embodiments, the UE 502 may be preconfigured with an encryption key and may be authenticated in the second AMF 506.

In certain embodiments, if the UE 502 belongs to the same PLMN, the UE 502 may connect 544 to a credentials server with its unencrypted SUPI and retrieve long term credentials (e.g., a USIM, an eSIM profile, etc.). In various embodiments, there may be different technologies to provision long term credentials, a USIM, and/or an eSIM to the UE 502 and there may be some message exchange to signal the credential server (e.g., OTA Server) identity and address, a UICC ID, a UICC vendor ID of the UE 502, and/or OTA keys for securing credentials.

In a twelfth communication 546 from the second AMF 506 to the UE 502, the second AMF 506 may send a registration accept to the UE 502 to indicate successful registration for profile provisioning.

In a thirteenth communication 548 from the UE 502 to the second AMF 506, the UE 502 may send a new registration request for initial registration to the second AMF 506, now using the newly provisioned profile.

In various embodiments, the second AMF 506 may perform 550 UDM selection. In some embodiments, there may be a dedicated UDM 510 for handling IoT registration and activation requests.

In a fourteenth communication 552 from the second AMF 506 to the UDM 510, the second AMF 506 sends an IoT subscription profile activation request to the UDM 510. In such embodiments, the subscription profile activation request may include the device ID corresponding to the UE 502 and the encrypted SUPI.

In some embodiments, the UDM 510 may verify 554 the encrypted SUPI and device ID binding, may determine whether it is the first request for subscription activation, and/or may determine whether there is misuse of the encrypted SUPI (e.g., initial misuse). In various embodiments, after verifying 554 the encrypted SUPI and device ID binding, the UDM 510 may activate the corresponding subscription profile.

In certain embodiments, the UDM 510 may notify 556 the DB 508 that the subscription for the SUPI and/or PLMN paired with the device ID has been successfully activated and that the DB 508 now should reject any further requests and/or that the DB 508 should delete the entry from the database.

In a fifteenth communication 558 from the UDM 510 to the second AMF 506, the UDM 510 acknowledges the activation of the subscription profile to the second AMF 506. In some embodiments, the subscription profile may contain the SUPI (e.g., unencrypted).

In one embodiment, the second AMF 506 may run 560 a normal authentication and/or authorization procedure, because the UE 502 is provisioned with corresponding credentials for authentication and/or authorization. In some embodiments, the authentication and/or authorization procedure may involve an AUSF.

In a sixteenth communication 562 from the second AMF 506 to the UDM 510, the second AMF 506 may invoke a Nudm_UEContextManagement_Registration service operation towards the UDM 510 including a subscription data retrieval indication. In some embodiments, the sixteenth communication 562 is not needed if it is performed as part of another communication.

In a seventeenth communication 564 from the UDM 510 to the second AMF 506, the UDM 510 invokes a Nudm-_SubscriptionData_UpdateNotification service operation to provide subscription data from the UDM 510. The second AMF 506 creates an MM context for the UE 502 after getting the mobility related subscription data from the UDM 510. In some embodiments, the seventeenth communication 564 is not needed if it is performed as part of another communication.

In an eighteenth communication 566 from the second AMF 506 to the UE 502, the second AMF 506 sends a registration accept to the UE 502.

Figure 6:
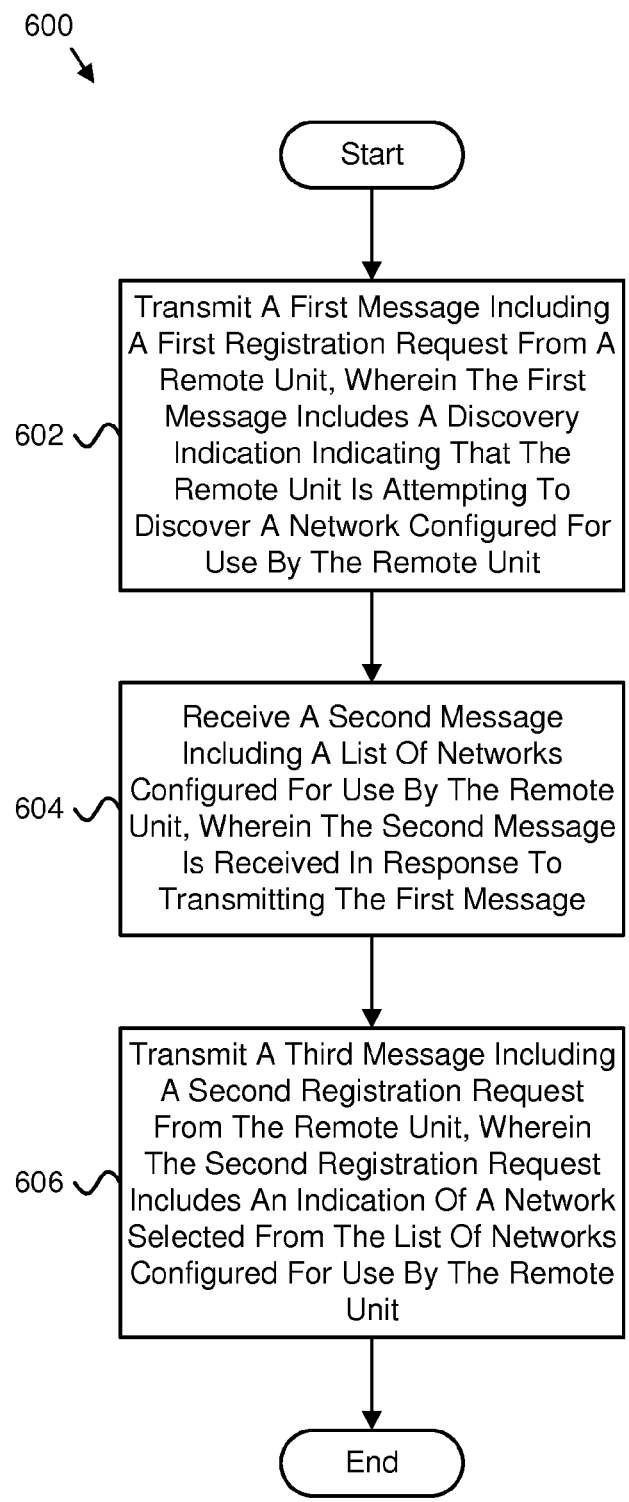
FIG. 6 is a schematic flow chart diagram illustrating one embodiment of a method for indicating a network for a remote unit.

FIG. 6 is a schematic flow chart diagram illustrating one embodiment of a method 600 for indicating a network for a remote unit. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 a first message including a first registration request from a remote unit 102. In such embodiments, the first message includes a discovery indication indicating that the remote unit 102 is attempting to discover a network configured for use by the remote unit 102. In various embodiments, the method 600 includes receiving 604 a second message including a list of networks configured for use by the remote unit 102. In such embodiments, the second message is received in response to transmitting the first message. In certain embodiments, the method 600 includes transmitting 606 a third message including a second registration request from the remote unit. In such embodiments, the second registration request includes an indication of a network selected from the list of networks configured for use by the remote unit.

In one embodiment, the method 600 includes determining a set of available mobile networks. In a further embodiment, the method 600 includes determining a first mobile network of the set of available mobile networks based on information indicating that the first mobile network supports internet-of-things device registration. In certain embodiments, transmitting the first message includes transmitting the first message to the first mobile network of the set of available mobile networks. In various embodiments, transmitting the third message includes transmitting the third message to a second mobile network of the set of available mobile networks, and the second mobile network is determined based on the list of networks. In some embodiments, the list of networks configured for use by the remote unit includes networks for which the remote unit has a subscription to.

In some embodiments, the first registration request and the second registration request each include an internet-of-things initial registration request. In various embodiments, the first message and the third message each include an encryption key corresponding to the remote unit 102, and the encryption key is used to encrypt data transmitted to the remote unit 102. In one embodiment, the second message includes an encryption key corresponding to a network device (e.g., a network unit 104), and the encryption key is used to encrypt data transmitted to the network device. In various embodiments, the remote unit 102 includes an internet-of-things device out of a set of internet-of-things devices.

Figure 7:
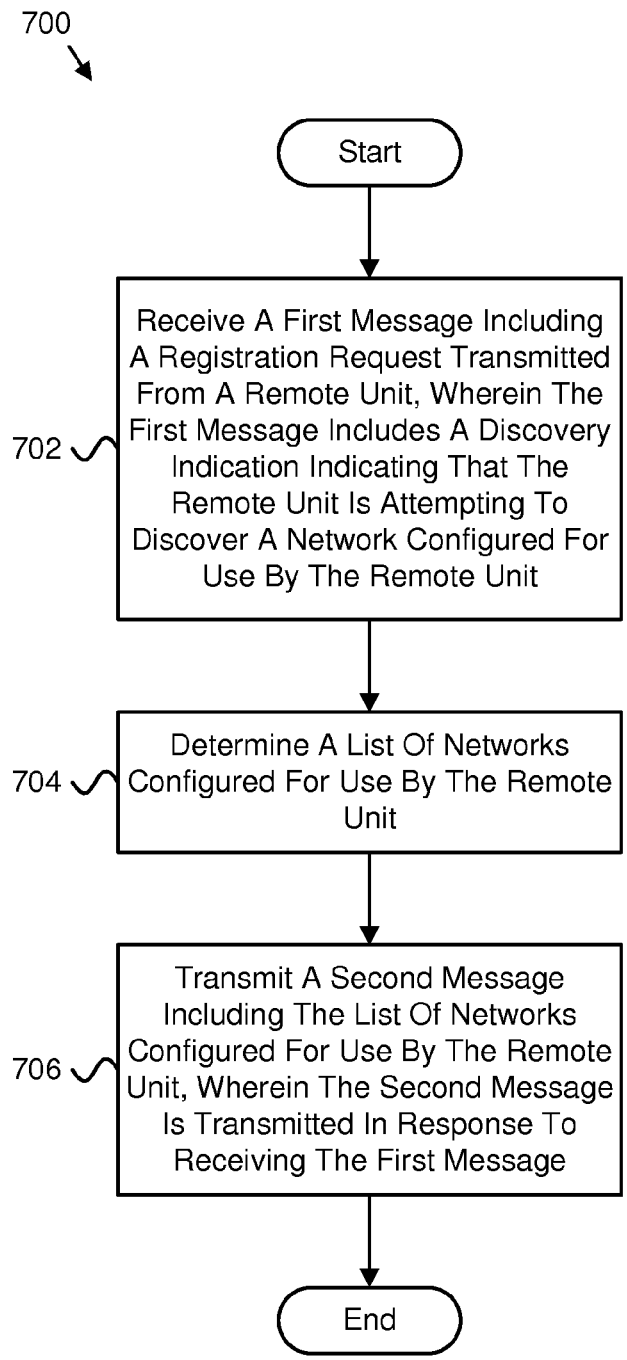
FIG. 7 is a schematic flow chart diagram illustrating another embodiment of a method for indicating a network for a remote unit.

FIG. 7 is a schematic flow chart diagram illustrating one embodiment of a method 700 for indicating a network for a remote unit. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a first message including a registration request transmitted from a remote unit 102. In such an embodiment, the first message includes a discovery indication indicating that the remote unit is attempting to discover a network configured for use by the remote unit. In various embodiments, the method 700 includes determining 704 a list of networks configured for use by the remote unit 102. In certain embodiments, the method 700 includes transmitting 706 a second message including the list of networks configured for use by the remote unit 102. In such embodiments, the second message is transmitted in response to receiving the first message.

In one embodiment, the registration request includes an internet-of-things initial registration request. In a further embodiment, the first message includes an encryption key corresponding to the remote unit 102. In certain embodiments, the second message includes an encryption key corresponding to a network device (e.g., a network unit 104).

In some embodiments, the remote unit 102 includes an internet-of-things device out of a set of internet-of-things devices. In certain embodiments, determining the list of networks configured for use by the remote unit 102 further includes transmitting a request to a database for the list of networks configured for use by the remote unit 102, wherein the database includes a correlation between the remote unit 102 and the list of networks. In various embodiments, determining the list of networks configured for use by the remote unit 102 further includes receiving a response to the request from the database, and the response includes the list of networks configured for use by the remote unit 102.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment comprising:
   determining a first mobile network of a set of available mobile networks based on information indicating that the first mobile network supports internet-of-things device registration;
   transmitting a first message comprising a first registration request from the user equipment to the first mobile network, wherein the first message comprises a discovery indication indicating that the user equipment is attempting to discover an internet of things network configured for use by the user equipment;
   receiving, at the user equipment, a second message comprising a list of internet of things networks configured for use by the user equipment, wherein the second message is received in response to transmitting the first message; and
   transmitting a third message comprising a second registration request from the user equipment, wherein the second registration request comprises an indication of an internet of things network selected from the list of internet of things networks configured for use by the user equipment.

2. The method of claim 1, further comprising determining the set of available mobile networks.

3. The method of claim 1, wherein the list of internet of things networks configured for use by the user equipment comprises networks for which the user equipment has a subscription to.

4. The method of claim 1, wherein the first message and the third message each comprise an encryption key corresponding to the user equipment, and the encryption key is used to encrypt data transmitted to the user equipment.

5. The method of claim 1, wherein the second message comprises an encryption key corresponding to a network device, and the encryption key is used to encrypt data transmitted to the network device.

6. The method of claim 1, wherein the user equipment comprises an internet-of-things device out of a set of internet-of-things devices.

7. An apparatus comprising a user equipment, the apparatus further comprising:

a processor that determines a first mobile network of a set of available mobile networks based on information indicating that the first mobile network supports internet-of-things device registration;

a transmitter that transmits a first message comprising a first registration request from the user equipment to the first mobile network, wherein the first message comprises a discovery indication indicating that the user equipment is attempting to discover an internet of things network configured for use by the user equipment; and a receiver that receives a second message comprising a list of internet of things networks configured for use by the user equipment, wherein the second message is received in response to transmitting the first message;

wherein the transmitter transmits a third message comprising a second registration request from the user equipment, wherein the second registration request comprises an indication of an internet of things network selected from the list of internet of things networks configured for use by the user equipment.

8. The apparatus of claim 7, further comprising a wherein the processor determines the set of available mobile networks.

9. The apparatus of claim 7, wherein the transmitter transmits the third message to a second mobile network of the set of available mobile networks, and the second mobile network is determined based on the list of internet of things networks.

10. A method of a network device, the method comprising:

receiving a first message comprising a registration request transmitted from a user equipment, wherein the first message comprises a discovery indication indicating that the user equipment is attempting to discover an internet of things network configured for use by the user equipment, wherein the network device is part of a first mobile network of a set of available mobile networks determined based on information indicating that the first mobile network supports internet-of-things device registration;

determining a list of internet of things networks configured for use by the user equipment; and transmitting a second message comprising the list of internet of things networks configured for use by the user equipment, wherein the second message is transmitted in response to receiving the first message.

11. The method of claim 10, wherein the registration request comprises an internet-of-things initial registration request.

12. The method of claim 10, wherein the first message comprises an encryption key corresponding to the user equipment.

13. The method of claim 10, wherein the second message comprises an encryption key corresponding to the network device.

14. The method of claim 10, wherein the user equipment comprises an internet-of-things device out of a set of internet-of-things devices.

15. An apparatus comprising a network device, the apparatus further comprising:

a receiver that receives a first message comprising a registration request transmitted from a user equipment, wherein the first message comprises a discovery indication indicating that the user equipment is attempting to discover an internet of things network configured for use by the user equipment, wherein the network device is part of a first mobile network of a set of available mobile networks determined based on information indicating that the first mobile network supports internet-of-things device registration;

a processor that determines a list of internet of things networks configured for use by the user equipment; and a transmitter that transmits a second message comprising the list of internet of things networks configured for use by the user equipment, wherein the second message is transmitted in response to receiving the first message.

16. The apparatus of claim 15, wherein the transmitter transmits a request to a database for the list of internet of things networks configured for use by the user equipment, and the database comprises a correlation between the user equipment and the list of internet of things networks.

17. The apparatus of claim 16, wherein the receiver receives a response to the request from the database, and the response comprises the list of internet of things networks configured for use by the user equipment.

* * * * *